US010454076B2

(12) United States Patent
Park et al.

(10) Patent No.: US 10,454,076 B2
(45) Date of Patent: Oct. 22, 2019

(54) RECHARGEABLE BATTERY

(71) Applicant: SAMSUNG SDI CO., LTD., Yongin-si, Gyeonggi-do (KR)

(72) Inventors: Sang-Kyoon Park, Yongin-si (KR); Yong-Chul Seo, Yongin-si (KR); Seung-Ho Kwak, Yongin-si (KR); Joong-Heon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 334 days.

(21) Appl. No.: 14/732,511

(22) Filed: Jun. 5, 2015

(65) Prior Publication Data

US 2016/0099440 A1    Apr. 7, 2016

(30) Foreign Application Priority Data

Oct. 7, 2014 (KR) .................. 10-2014-0135110

(51) Int. Cl.
*H01M 2/02* (2006.01)
*H01M 10/04* (2006.01)
(Continued)

(52) U.S. Cl.
CPC ......... *H01M 2/0217* (2013.01); *H01M 2/024* (2013.01); *H01M 2/0277* (2013.01); *H01M 2/0473* (2013.01); *H01M 2/0482* (2013.01); *H01M 2/06* (2013.01); *H01M 2/12* (2013.01); *H01M 2/263* (2013.01); *H01M 2/30* (2013.01);
(Continued)

(58) Field of Classification Search
CPC ... H01M 2/0217; H01M 2/024; H01M 2/0277
See application file for complete search history.

(56) References Cited

U.S. PATENT DOCUMENTS

2011/0183181 A1* 7/2011 Moon ................ H01M 2/0237
429/136
2012/0052371 A1* 3/2012 Kim .................... H01M 2/027
429/179
2015/0340663 A1* 11/2015 Minagata ............ H01M 2/0237
429/163

FOREIGN PATENT DOCUMENTS

EP    2 355 203 A1    8/2011
EP    2 426 751 B1    4/2013
(Continued)

OTHER PUBLICATIONS

Machine translation of JP2014038706, obtained Jan. 2017.*
(Continued)

*Primary Examiner* — Milton I Cano
*Assistant Examiner* — Abibatu O Ojo-Amoo
(74) *Attorney, Agent, or Firm* — Lewis Roca Rothgerber Christie LLP (57) ABSTRACT

A rechargeable battery according to an exemplary embodiment of the present invention includes: an electrode assembly including electrodes at opposite sides of a separator, each of the electrodes having a coated region and an uncoated region, and the electrodes and the separator being spirally wound; an insulating case for accommodating the electrode assembly and allowing the uncoated regions to be drawn out through respective uncoated region holes; a case for accommodating the insulating case; and a cap plate coupled to an opening of the case and allowing electrode terminals respectively coupled to the uncoated regions to be drawn out through respective terminal holes.

12 Claims, 8 Drawing Sheets

(51) Int. Cl.
  *H01M 2/12*  (2006.01)
  *H01M 2/04*  (2006.01)
  *H01M 2/26*  (2006.01)
  *H01M 2/30*  (2006.01)
  *H01M 2/06*  (2006.01)
  *H01M 2/16*  (2006.01)
  *H01M 2/36*  (2006.01)

(52) U.S. Cl.
  CPC ...... *H01M 10/0431* (2013.01); *H01M 2/1241* (2013.01); *H01M 2/16* (2013.01); *H01M 2/361* (2013.01); *H01M 2/362* (2013.01)

(56) References Cited

FOREIGN PATENT DOCUMENTS

| | | |
|---|---|---|
| EP | 2 866 279 A1 | 4/2015 |
| JP | 2014-038706 | 2/2014 |
| KR | 10-1036089 B1 | 5/2011 |
| KR | 10-2012-0020565 A | 3/2012 |
| WO | WO 2014/002647 A1 | 1/2014 |

OTHER PUBLICATIONS

EPO Search Report dated Mar. 2, 2016, for corresponding European Patent application 15178456.8, (9 pages).
English machine translation of Japanese Publication 2014-038706 dated Feb. 27, 2014, listed above, (15 pages).
EPO Office Action dated Mar. 22, 2017, for corresponding European Patent Application No. 15178456.8 (7 pages).

\* cited by examiner

RECHARGEABLE BATTERY

CROSS-REFERENCE TO RELATED APPLICATION

This application claims priority to and the benefit of Korean Patent Application No. 10-2014-0135110 filed in the Korean Intellectual Property Office on Oct. 7, 2014, the entire content of which is incorporated herein by reference.

BACKGROUND

1. Field

Aspects of embodiments of the present invention relate to a rechargeable battery capable of insulating an electrode assembly inside a case.

2. Description of the Related Art

A rechargeable battery differs from a primary battery in that the rechargeable battery is designed to be repeatedly charged and discharged, while the primary battery is not designed to be recharged.

A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

The above information disclosed in this Background section is only for enhancement of understanding of the background of the invention and therefore it may contain information that does not form the prior art that is already known in this country to a person of ordinary skill in the art.

SUMMARY

An aspect of an exemplary embodiment of the present invention is directed toward a rechargeable battery for reducing the number of parts for electrically insulating an electrode assembly from a case, as well as enabling sizes of the parts to be easily controlled.

A rechargeable battery according to an exemplary embodiment of the present invention includes: an electrode assembly including electrodes at opposite sides of a separator, each of the electrodes having a coated region and an uncoated region, and the electrodes and the separator being spirally wound; an insulating case for accommodating the electrode assembly and allowing the uncoated regions to be drawn out through respective uncoated region holes; a case for accommodating the insulating case; and a cap plate combined or coupled to an opening of the case and allowing electrode terminals respectively coupled to the uncoated regions to be drawn out through respective terminal holes.

In an internal space set by the case and the cap plate, the insulating case may be formed such that it is directed toward a bottom and side walls of the case and an inner side of the cap plate to accommodate the electrode assembly The uncoated regions may be respectively coupled to the electrode terminals outside of the insulating case.

Each of the electrode terminals may include: an internal plate that is coupled or connected to the respective uncoated region by welding and is inside of an internal space set by the case and the cap plate; a pillar portion that protrudes out of the cap plate from the internal plate through the respective terminal hole; and an external plate coupled to the pillar portion at an outer surface of the cap plate.

The electrode assembly may include one electrode assembly or two electrode assemblies.

The electrode assembly may include two electrode assemblies, and the uncoated regions of the same polarity may face each other to be coupled to a respective one of the internal plates.

The insulating case may be formed from one piece of material, and may be bent to accommodate the electrode assembly.

The insulating case may include: a first surface portion having the uncoated region holes facing the cap plate; second and third surface portions bent from the first surface portion to face each other at opposite surfaces of the electrode assembly; and fourth and fifth surface portions that protrude at edges of the second and third surface portions to face lateral sides of the electrode assembly; and a sixth surface portion that protrudes at edges of the second and third surface portions and is opposite to the uncoated regions.

The fourth, fifth, and sixth surface portions may further include flanges that protrude in directions parallel to the second and third surface portions to be coupled to each other.

The flanges may form an interval between an inner surface of the case and an outer surface of the insulating case.

The insulating case may include an internal vent hole corresponding to a vent hole of the cap plate.

The insulating case may include an internal electrolyte injection opening corresponding to an electrolyte injection opening provided of the cap plate.

According to the exemplary embodiment of the present invention, the insulating case is integrally formed, thereby having an effect of reducing the number of parts for electrically insulating the electrode assembly from the case.

Accordingly, since the size of the insulating case can be controlled, size control for electrically insulating the electrode assembly from the case can be easily achieved.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification. Also, in the context of the present application, when a first element is referred to as being "on" a second element, it can be directly on the second element or be indirectly on the second element with one or more intervening elements interposed therebetween. Further, in the context of the present application, when a first element is referred to as being "coupled" or "connected" to a second element, it can be directly coupled or connected to the second element or be indirectly coupled or connected to the second element with one or more intervening elements interposed therebetween.

A rechargeable battery includes an electrode assembly for performing charging and discharging operations, a case for accommodating the electrode assembly, a cap plate combined or coupled to an opening of the case, and electrode terminals through which the electrode assembly is drawn out of the cap plate.

To electrically insulate the electrode assembly from the case in the rechargeable battery, an insulating tape is provided at a bottom and side walls of the case and at an external circumference of the electrode assembly.

In such a rechargeable battery, a large number of parts are used for insulation and sizes of the parts are separately controlled depending on the parts.

Figure 1:
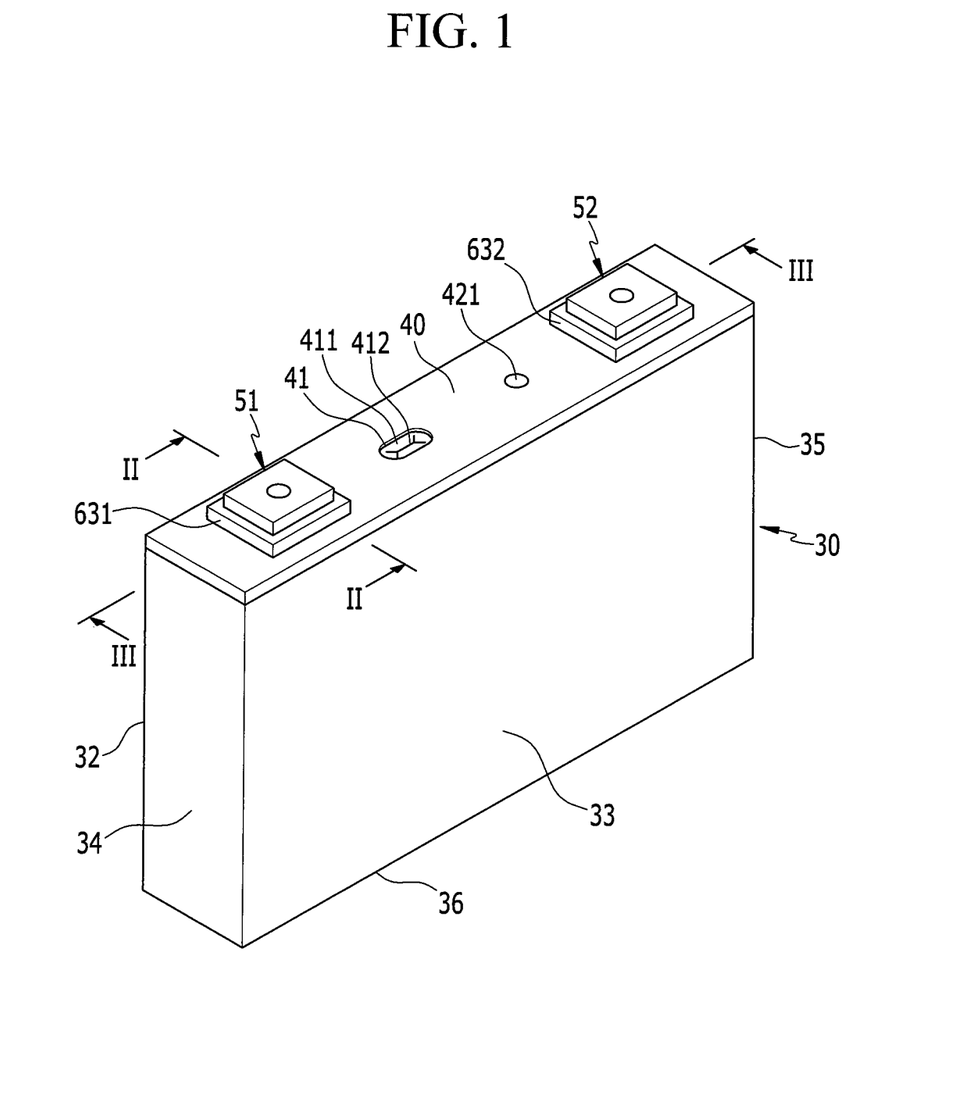
FIG. 1 is a perspective view of a rechargeable battery according to an exemplary embodiment of the present invention.
Figure 2:
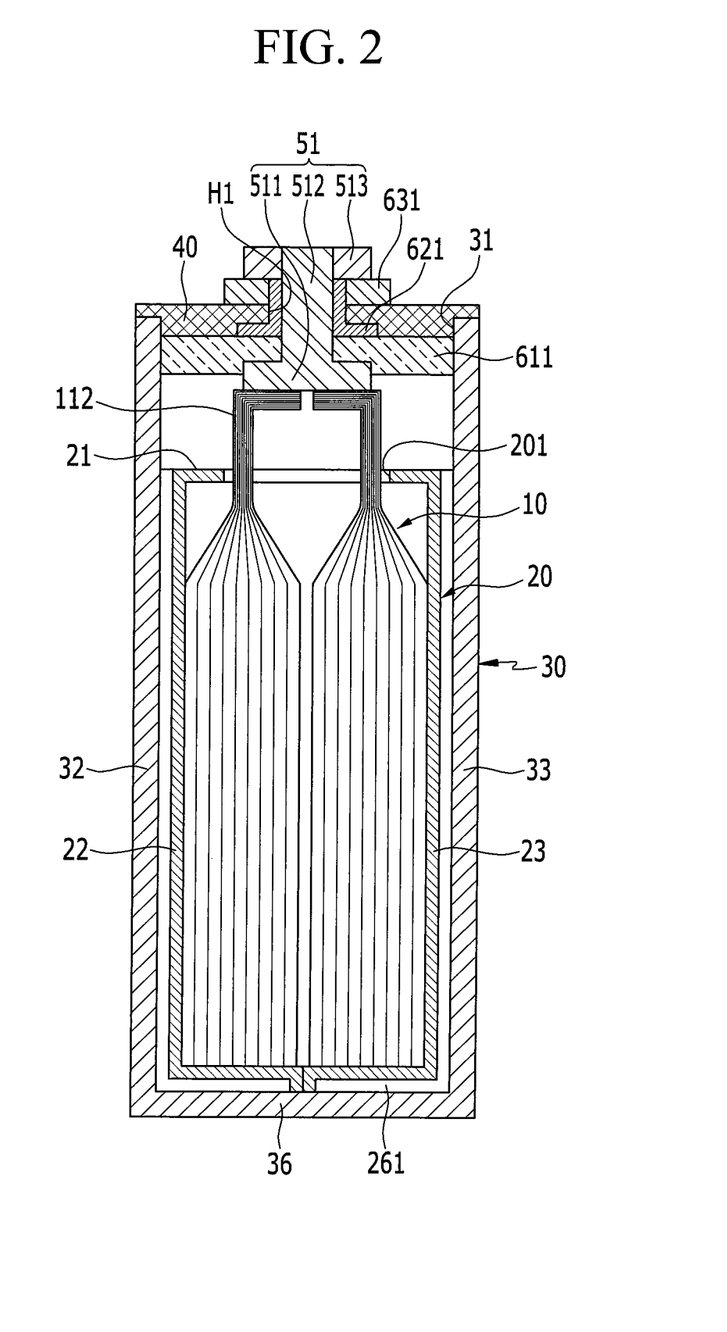
FIG. 2 is a cross-sectional view of FIG. 1 taken along the line II-II.
Figure 3:
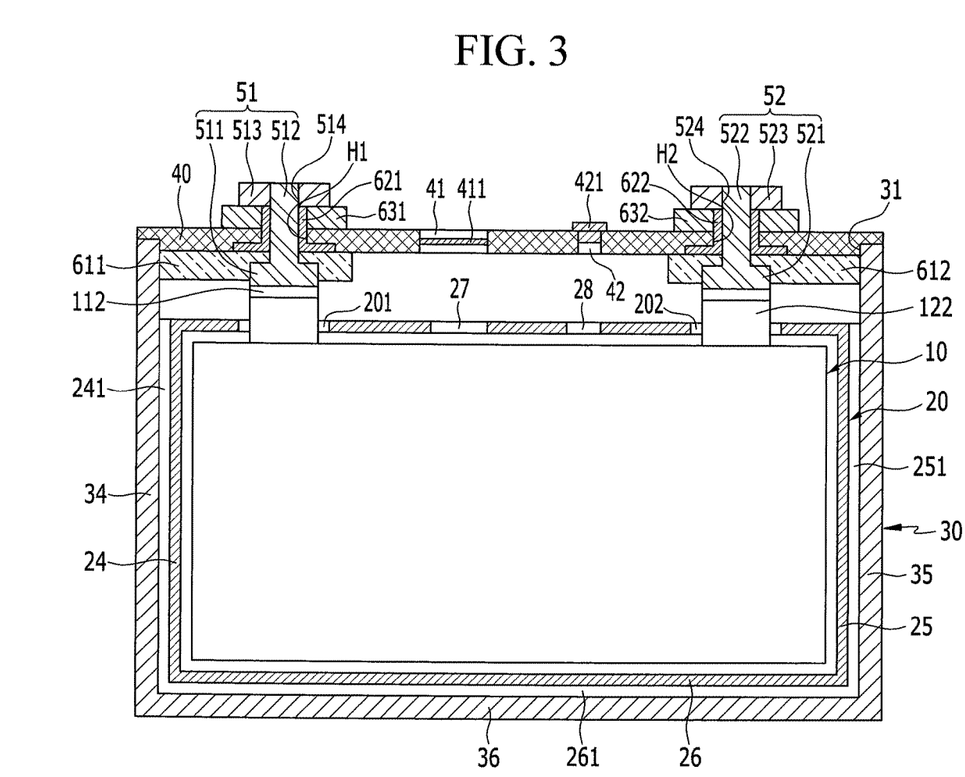
FIG. 3 is a cross-sectional view of FIG. 1 taken along the line III-III.

FIG. 1 is a perspective view of a rechargeable battery according to an exemplary embodiment of the present invention, FIG. 2 is a cross-sectional view of FIG. 1 taken along the line II-II, and FIG. 3 is a cross-sectional view of FIG. 1 taken along the line III-III.

Referring to FIGS. 1 to 3, the rechargeable battery according to the exemplary embodiment includes: an electrode assembly 10 in which charging and discharging of a current is performed; an insulating case 20 for accommodating the electrode assembly 10; a case 30 for accommodating the insulating case 20; and a cap plate 40 combined or coupled to an opening of the case 30 to seal the opening thereof.

Figure 4:
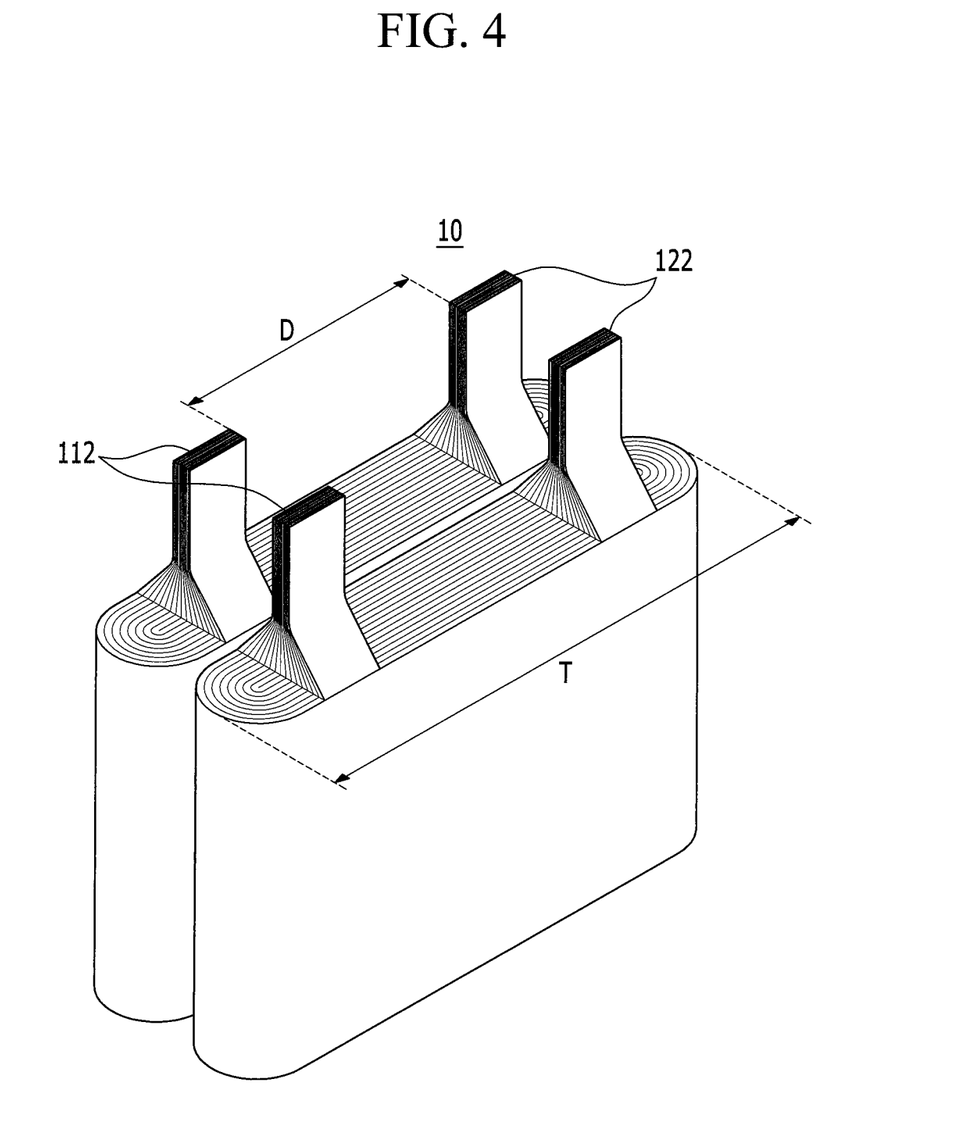
FIG. 4 is a perspective view of an electrode assembly applied to FIG. 2.
Figure 5:
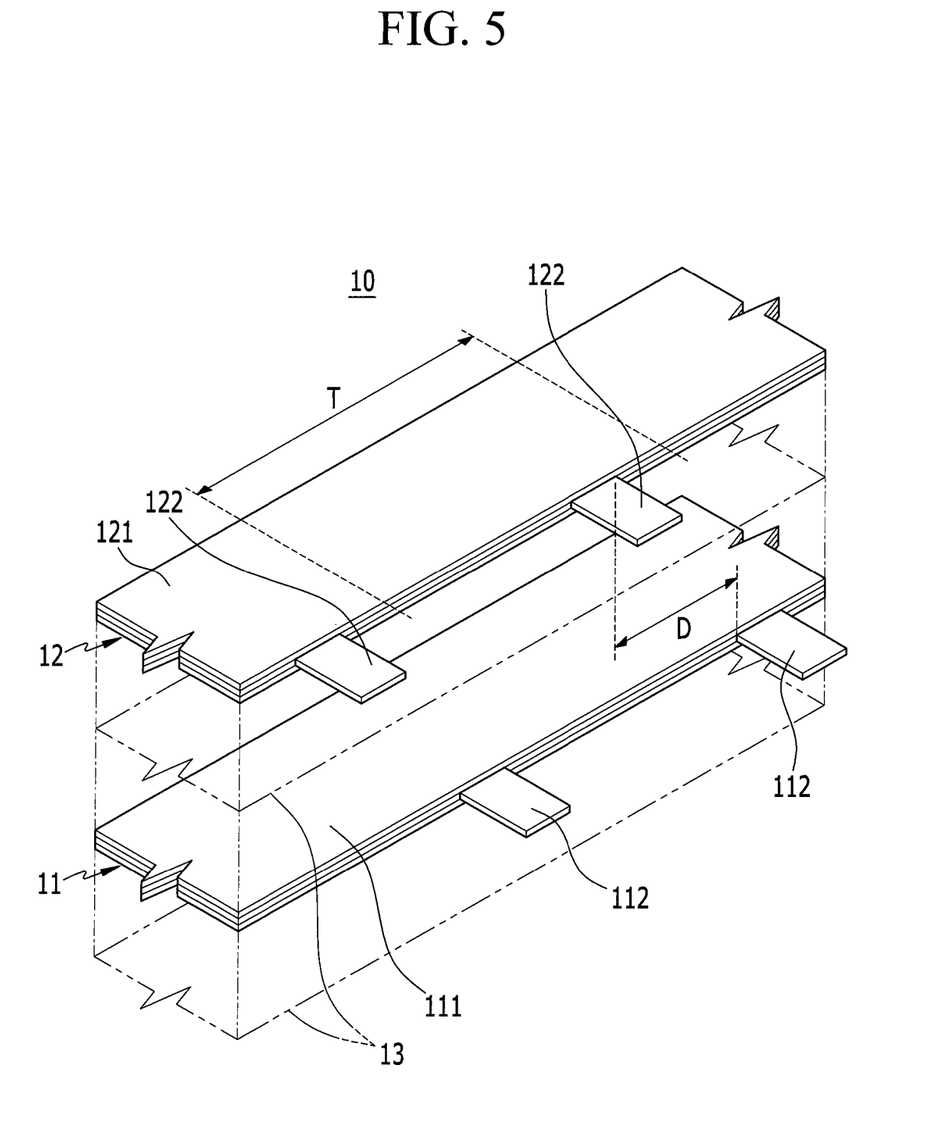
FIG. 5 is an exploded perspective view of a portion of the electrode assembly illustrated in FIG. 4.

FIG. 4 is a perspective view of the electrode assembly of FIG. 2, and FIG. 5 is an exploded perspective view of a portion of the electrode assembly illustrated in FIG. 4.

Referring to FIGS. 4 and 5, the electrode assembly 10 is formed by disposing a first electrode 11 (e.g., a negative electrode) and a second electrode 12 (e.g., a positive electrode) at opposite lateral sides of a separator 13, which serves as an electrical insulator, and then spirally winding the first electrode 11, the separator 13, and the second electrode 12.

The electrode assembly 10 may be formed as one electrode assembly, but is formed as two electrode assemblies in the present exemplary embodiment. The present disclosure, however, is not limited thereto.

The electrode assembly 10 may be formed to have a plate shape, opposite ends of which have an oval shape (e.g., at upper and lower ends of FIG. 4) such that they can be accommodated in the case 30. For example, the opposite ends of the electrode assembly 10 may each have a rounded shape.

The first and second electrodes 11 and 12 respectively include coated regions 111 and 121 where an active material is coated on a current collector formed of a metal foil (e.g., copper or aluminum foil), and uncoated regions 112 and 122 where the active material is not coated thereon to expose the current collector.

The uncoated regions 112 and 122 are disposed at one end of the spirally wound electrode assembly 10 and within one winding range T of the electrode assembly 10 from one end thereof while being spaced apart from each other by a distance D.

For example, the uncoated region 112 of the first electrode 11 is disposed at one end of the spirally wound electrode assembly 10, and the uncoated region 122 of the second electrode 12 is disposed at the other end of the spirally wound electrode assembly 10 while being spaced apart from the uncoated region 112 of the negative electrode 11 by the distance D.

Accordingly, when the first and second electrodes 11 and 12 are spirally wound, the uncoated region 112 of the first electrode 11 is disposed to the left of one end of the spirally wound electrode assembly 10 (e.g., the lower end of FIG. 4), and the uncoated region 122 of the second electrode 12 is disposed to the right of the same end of the electrode assembly 10 (e.g., the upper end of FIG. 4). The present disclosure, however, is not limited thereto, and the foregoing positions of the uncoated regions 112 and 122 may be switched.

As such, in the first and second electrodes 11 and 12, as areas of the coated regions 111 and 121 are maximized or increased and areas of the uncoated regions 112 and 122 are minimized or reduced, capacity of the electrode assembly 10 can be increased.

Figure 6:
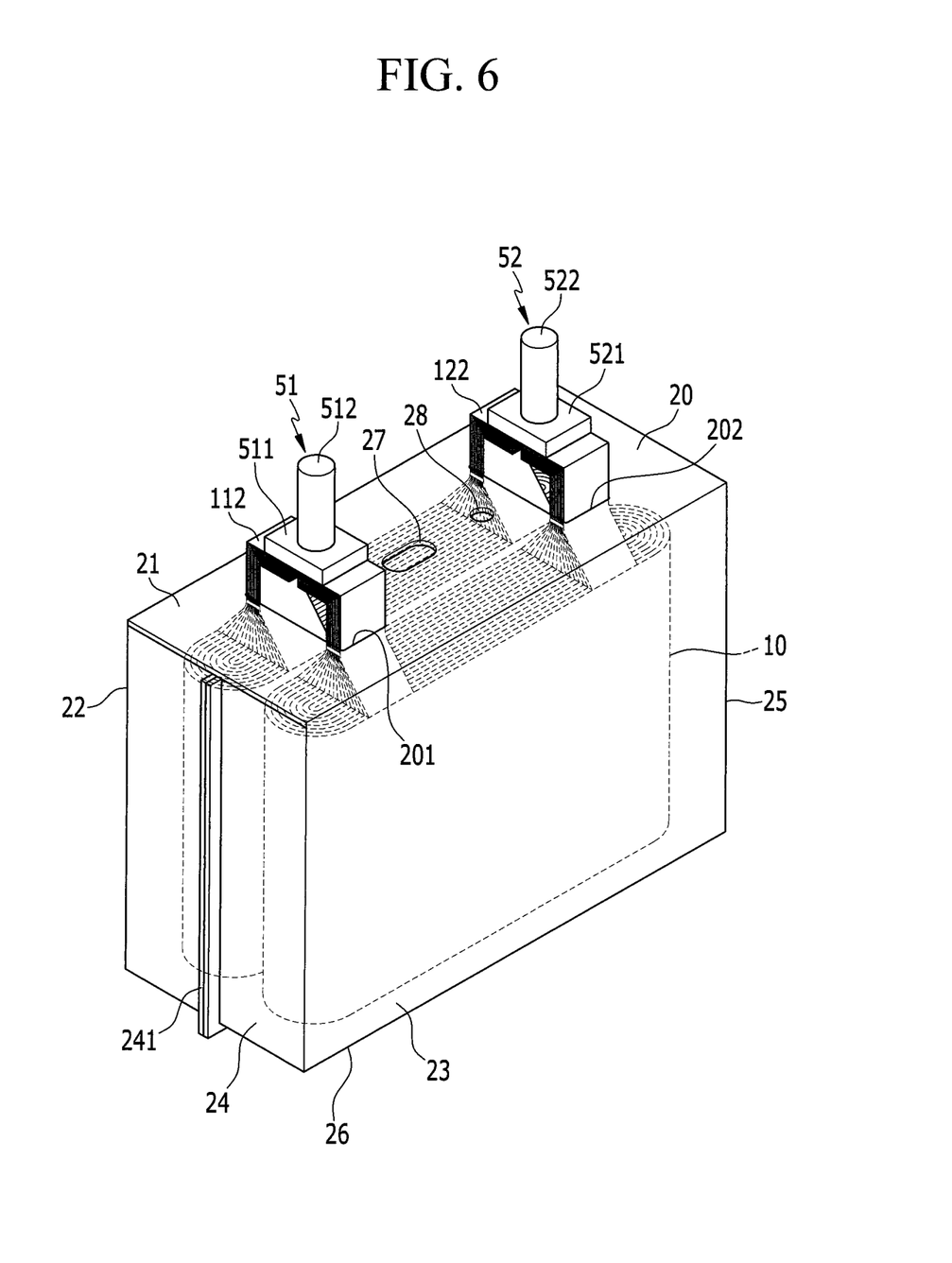
FIG. 6 is a perspective view of an insulating case coupled to the electrode assembly of FIG. 2.

FIG. 6 is a perspective view of the insulating case coupled to the electrode assembly of FIG. 2.

Referring to FIGS. 2 to 4 and 6, two electrode assemblies 10 are disposed in parallel to be electrically coupled to each other.

For example, in the two electrode assemblies 10 of FIGS. 2 to 4 and 6, the uncoated region 112 of the first electrode 11 of one electrode assembly faces the uncoated region 112 of the first electrode 11 of the other electrode assembly to be coupled to each other, and the uncoated region 122 of the second electrode 12 of one electrode assembly faces the uncoated region 122 of the second electrode 12 of the other electrode assembly to be coupled to each other.

The insulating case 20 is provided with uncoated region holes 201 and 202, and the uncoated regions 112 and 122 of the electrode assembly 10 accommodated in the insulating case 20 are respectively drawn out of the insulating case 20 through the uncoated region holes 201 and 202.

For example, in addition to electrically insulating the accommodated electrode assembly 10 from the case 30, the insulating case 20 enables the uncoated regions 112 and 122 to be electrically coupled to first and second electrode terminals 51 and 52 (e.g., negative and positive electrode terminals), respectively.

Referring back to FIGS. 1 to 3, the case 30 accommodates the insulating case 20 for accommodating the electrode assembly 10, forms an external appearance of the rechargeable battery, and provides mechanical strength for the rechargeable battery.

The case 30 sets or provides a space for accommodating one electrode assembly 10 or two electrode assemblies 10.

For example, the case 30 is formed to have a substantially cuboid shape, and includes a quadrangular opening 31 at one side into which the electrode assembly 10 can be inserted, a bottom 36 that faces the opening 31 to correspond thereto, and two wide side walls 32 and 33 and two narrow side walls 34 and 35 that are set between the opening 31 and the bottom 36. The present disclosure, however, is not limited thereto.

The cap plate 40 is combined or coupled to the opening 31 of the case 30 to seal the case 30, and is provided with two terminal holes H1 and H2.

For example, the first and second electrode terminals 51 and 52 are installed in the terminal holes H1 and H2.

For example, the case 30 and the cap plate 40 may be formed of aluminum such that they are welded to each other in the opening 31, but the present disclosure is not limited thereto.

In addition, the cap plate 40 is further provided with a vent hole 41 and an electrolyte injection opening 42.

The vent hole 41 is sealed by a vent plate 411 capable of discharging internal pressure that may be created by a gas that is generated inside the rechargeable battery by the charging and discharging operations of the electrode assembly 10.

When the internal pressure of the rechargeable battery reaches a predetermined or set pressure, the vent plate 411 is ruptured to open the vent hole 41, thereby discharging the gas and the internal pressure.

The vent plate 411 is provided with a notch 412 for inducing the rupture.

After the cap plate 40 is combined and welded to the case 30, the electrolyte injection opening 42 allows the electrolyte solution to be injected into the case 30.

After the electrolyte solution is injected, the electrolyte injection opening 42 is sealed by a sealing cap 421.

FIG. 6 is a perspective view of the insulating case coupled to the electrode assembly of FIG. 2.

Referring to FIGS. 2, 3, and 6, the first and second electrode terminals 51 and 52 are respectively coupled to the uncoated regions 112 and 122 of the electrode assembly 10 to allow the current to be discharged from or charged to the electrode assembly 10.

In an internal space set or provided by the case 30 and the cap plate 40, the insulating case 20 is formed to be directed toward the bottom 36 of the case 30, the wide side walls 32 and 33, the narrow side walls 34 and 35, and an inner side of the cap plate 40, thereby accommodating the electrode assembly 10.

Figure 7:
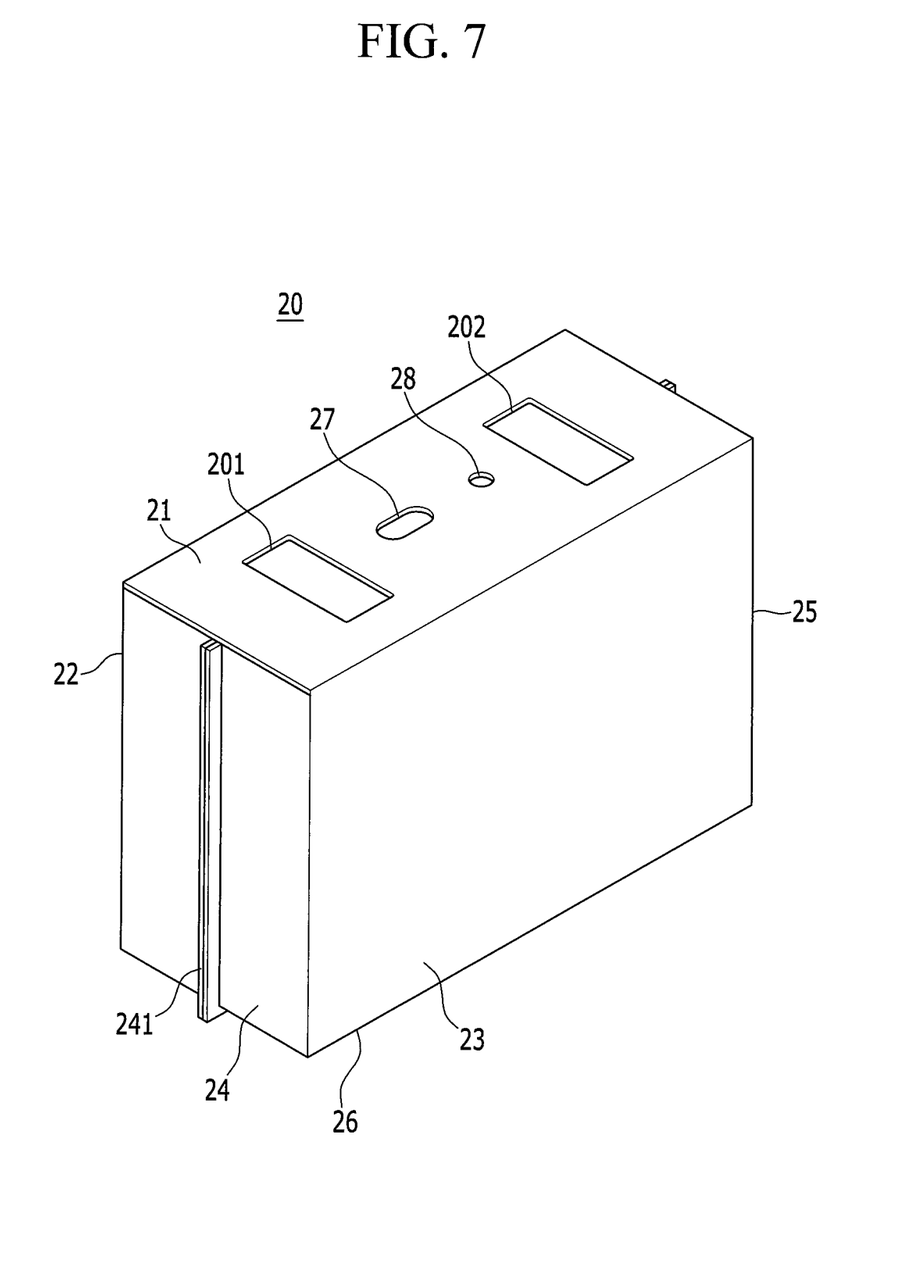
FIG. 7 is a perspective view of the insulating case applied to FIG. 6.
Figure 8:
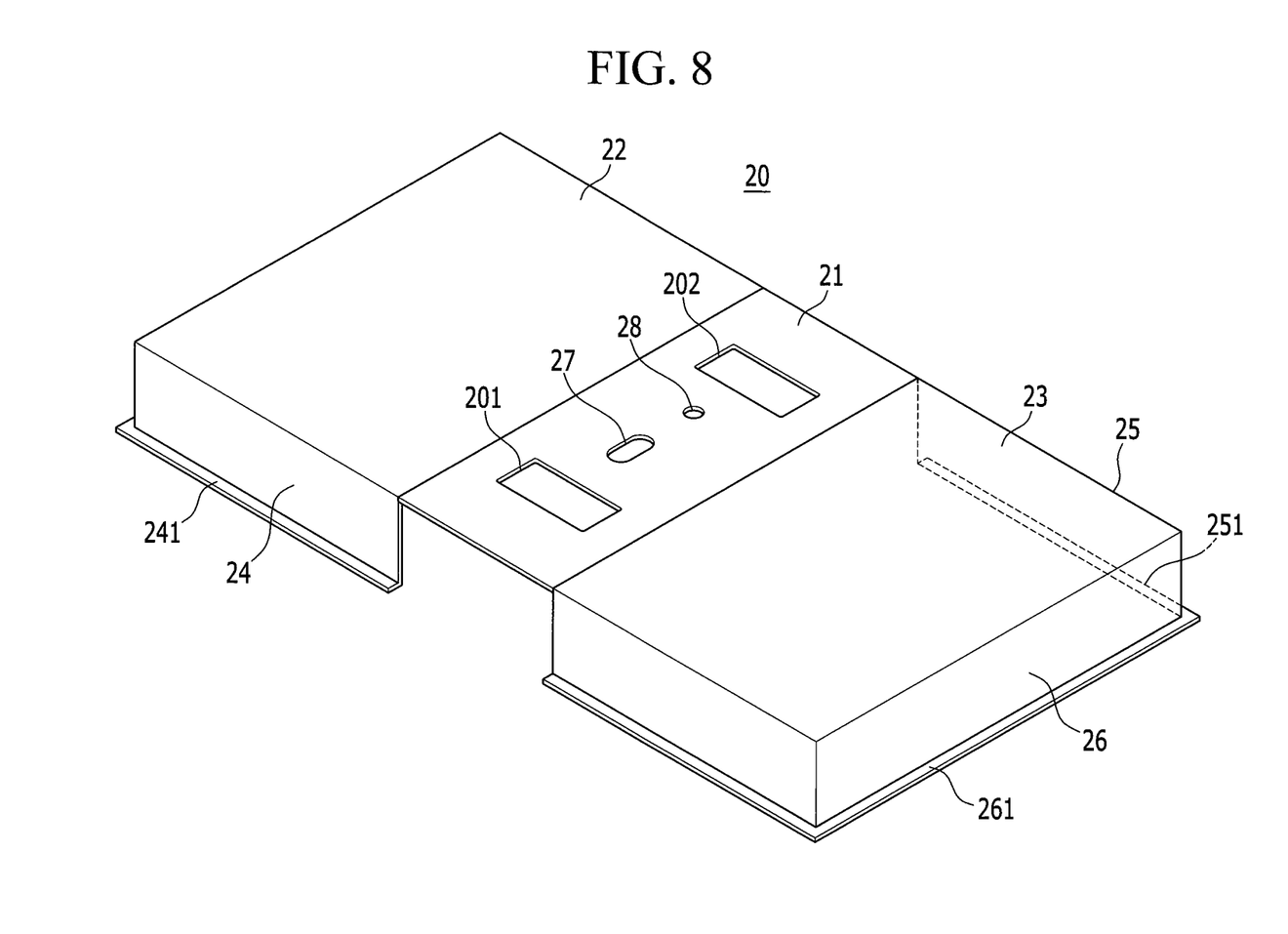
FIG. 8 is an exploded perspective view of the insulating case illustrated in FIG. 7 in an unbent or unfolded state.

FIG. 7 is a perspective view of the insulating case of FIG. 6, and FIG. 8 is an exploded perspective view of the insulating case illustrated in FIG. 7 in an unbent or unfolded state.

Referring to FIGS. 5 to 8, the insulating case 20 may be formed of one material, and is formed such that it is bent or folded to accommodate the electrode assembly 10. For example, the insulating case may be formed from one piece of material. In some embodiments, the insulating case 20 may be a single, sole, or integral component that is bent or folded to accommodate the electrode assembly 10.

For example, the insulating case 20 is injection-molded using an electrically insulating material and is then bent or folded, such that it electrically insulates the electrode assembly 10 from the case 30 between the outside of the electrode assembly 10 and the inside of six surfaces of the case 30.

For example, the insulating case 20 includes a first surface portion 21, a second surface portion 22, a third surface portion 23, a fourth surface portion 24, a fifth surface portion 25, and a sixth surface portion 26, thereby forming substantially a cuboid shape.

The first surface portion 21 includes the uncoated region holes 201 and 202 that face the cap plate 40.

The second and third surface portions 22 and 23 are vertically bent from the first surface portion 21 to face opposite wide surfaces of the electrode assembly 10 (e.g., wide surfaces of the electrode assembly that face away from each other) and to face the wide side walls 32 and 33 of the case 30.

The fourth, fifth, and sixth surface portions 24, 25, and 26 vertically protrude at or from a respective one of edges of the second and third surface portions 22 and 23 (e.g., when the insulating case 20 is an unbent or unfolded state), and are attached to each other when the second and third surface portions 22 and 23 are bent from the first surface portion 21. For example, when the insulating case 20 is bent or folded, the second and third surface portions 22 and 23 may be coupled to each other by way of the fourth, fifth, and sixth surface portions 24, 25, and 26.

The fourth and fifth surface portions 24 and 25 are attached at opposite lateral sides facing lateral sides of the electrode assembly 10 and the narrow side walls 34 and 35 of the case 30, while the sixth surface portion 26 is disposed opposite to the uncoated regions 112 and 122 and faces the bottom 36 of the case 30.

Accordingly, the insulating case 20 may electrically insulate the electrode assembly 10 from the cap plate 40 and the case 30 at six surfaces.

In addition, the fourth, fifth, sixth surface portions 24, 25, and 26 are provided with flanges 241, 251, and 261 that protrude in a direction parallel or substantially parallel to the second and third surface portions 22 and 23 to be bonded to each other.

While the electrode assembly 10 is accommodated in the insulating case 20 inside the case 30, the flanges 241, 251, and 261 are supported by the narrow side walls 34 and 35 and the bottom 36, respectively, of the case 30.

For example, inside the case 30, the insulating case 20 and the flanges 241, 251, and 261 set an interval between the electrode assembly 10 and the case 30 to absorb an external impact and a load, thereby protecting the electrode assembly 10.

In addition, the insulating case 20 is provided with an internal vent hole 27.

Formed to correspond to the vent hole 41 provided in the cap plate 40, the internal vent hole 27 allows the internal pressure, which may be created by a gas generated in the electrode assembly 10, to be delivered to the vent hole 41 and to be discharged therethrough.

In addition, the insulating case 20 is provided with an internal electrolyte injection opening 28.

Formed to correspond to the electrolyte injection opening 42 provided in the cap plate 40, the internal electrolyte injection opening 28 allows the electrolyte solution injected through the electrolyte injection opening 42 to be injected into the insulating case 20.

Referring back to FIGS. 2, 3, and 6, the first and second electrode terminals 51 and 52 are installed in the terminal holes H1 and H2, respectively, of the cap plate 40, and are electrically coupled to the electrode assembly 10 through the uncoated regions 112 and 122, respectively.

The uncoated regions 112 and 122 are drawn out of the insulating case 20 through the uncoated region holes 201 and 202, respectively, such that they are coupled to the first and second electrode terminals 51 and 52, respectively, outside of the insulating case 20.

In this case, the uncoated regions 112 and 122 penetrate the uncoated region holes 201 and 202, respectively, toward the cap plate 40, and after penetrating them, are bent to be parallel or substantially parallel to the cap plate 40 to be welded to the first and second electrode terminals 51 and 52, respectively.

The first and second electrode terminals 51 and 52 may be formed to have the same or substantially the same structure.

Referring to the drawings to illustrate the structure, the first and second electrode terminals 51 and 52 respectively include internal plates 511 and 521, pillar portions 512 and 522, and external plates 513 and 523.

The internal plates 511 and 521 are formed wider than the pillar portions 512 and 522 and thus are welded to the uncoated regions 112 and 122 at or with the wider areas, and disposed inside of the cap plate 40.

In this case, the uncoated regions (112, 112; 122, 122) of the two electrode assemblies 10 are bent to face each other and are welded to the internal plates 511 and 521, respectively.

The pillar portions 512 and 522 pass through the terminal holes H1 and H2, respectively, from the respective internal plates 511 and 521 to protrude out of the cap plate 40.

The external plates 513 and 523 are electrically coupled to the pillar portions 512 and 522, respectively, at an outer surface of the cap plate 40.

Accordingly, the electrode assembly 10 can be drawn out of the case 30 through the uncoated regions 112 and 122 and the first and second electrode terminals 51 and 52.

In addition, since the uncoated regions 112 and 122 are directly coupled to the first and second electrode terminals 51 and 52, respectively, a structure for drawing the electrode assembly 10 out of the case 30 can be simplified.

Meanwhile, internal insulating members 611 and 612 and gaskets 621 and 622 are interposed between the respective first and second electrode terminals 51 and 52 and the inner side of the cap plate 40 to electrically insulate the first and second electrode terminals 51 and 52 from the cap plate 40.

In addition, since one side of each of the internal insulating members 611 and 612 is attached to the cap plate 40 while the other side partially encloses the respective internal plate 511 and 521 of the first and second electrode terminals 51 and 52 and the pillar portions 512 and 522, a coupling or connecting structure between the first and second electrode terminals 51 and 52 and the respective uncoated regions 112 and 122 can be stabilized.

The gaskets 621 and 622 are installed between the respective pillar portions 512 and 522 of the first and second electrode terminals 51 and 52 and respective inner sides of the terminal holes H1 and H2 of the cap plate 40, thereby sealing and electrically insulating between the pillar portions 512 and 522 and the terminal holes H1 and H2 of the cap plate 40.

The gaskets 621 and 622 are installed to be further extended between the respective internal insulating members 611 and 612 and the inner side of the cap plate 40 to further seal between the internal insulating members 611 and 612 and the cap plate 40.

For example, in a structure where the first and second electrode terminals 51 and 52 are installed in the cap plate 40, the gaskets 621 and 622 prevent the electrolyte solution from leaking through the terminal holes H1 and H2 (or reduce a likelihood or amount of such leakage).

In addition, the gaskets 621 and 622 may be further extended between respective external insulating members 631 and 632 and the respective pillar portions 512 and 522 to further seal therebetween.

After the pillar portions 512 and 522 are inserted into the terminal holes H1 and H2, respectively, while interposing the respective gaskets 621 and 622 therebetween, the pillar portions 512 and 522 are then inserted into respective coupling holes 514 and 524 the external plates 513 and 523 while interposing the respective external insulating members 631 and 632 therebetween, the vicinities of the coupling holes 514 and 524 can be caulked or welded to allow the pillar portions 512 and 522 to be fixed to the respective external plates 513 and 523.

As such, the first and second electrode terminals 51 and 52 can be installed in the cap plate 40.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SOME OF THE SYMBOLS

10: electrode assembly
11, 12: first, second electrode (e.g., negative, positive electrode)
13: separator
20: insulating case
21, 22, 23: first, second, third surface portion
24, 25, 26: fourth, fifth, sixth surface portion
27: internal vent hole
28: internal electrolyte injection opening
30: case
31: opening
32, 33: wide side wall
34, 35: narrow side wall
36: bottom
40: cap plate
41: vent hole
42: electrolyte injection opening
51, 52: first, second electrode (e.g., negative, positive electrode) terminal
111, 121: coated region
112, 122: uncoated region
201, 202: uncoated region hole
241, 251, 261: flange
411: vent plate
412: notch
421: sealing cap
514, 524: coupling hole
511, 521: internal plate
512, 522: pillar portion
513, 523: external plate
611, 612: internal insulating member
621, 622: gasket
631, 632: external insulating member
D: distance
H1, H2: terminal hole
T: one winding range

What is claimed is:

1. A rechargeable battery comprising: an electrode assembly comprising electrodes at opposite sides of a separator, each of the electrodes comprising a current collector having a coated region and uncoated regions, and the electrodes and the separator being spirally wound; an insulating case for accommodating the electrode assembly and having uncoated region holes; a case for accommodating the insulating case; and a cap plate coupled to an opening of the case and allowing electrode terminals respectively coupled to the uncoated regions to be drawn out through respective terminal holes, wherein materials of the current collectors of the respective electrodes are continuously drawn out through respective uncoated region holes, and wherein the insulating case comprises a first surface portion having the uncoated region holes facing the cap plate and having a portion extending across the electrode assembly between the uncoated regions.

2. The rechargeable battery of claim 1, wherein, in an internal space set by the case and the cap plate, the insulating case is formed such that it is directed toward a bottom and side walls of the case and an inner side of the cap plate to accommodate the electrode assembly.

3. The rechargeable battery of claim 1, wherein the uncoated regions are respectively coupled to the electrode terminals outside of the insulating case.

4. The rechargeable battery of claim 3, wherein each of the electrode terminals comprises: an internal plate that is coupled to the respective uncoated regions by welding and is inside of an internal space set by the case and the cap plate; a pillar portion that protrudes out of the cap plate from the internal plate through the respective terminal hole; and an external plate coupled to the pillar portion at an outer surface of the cap plate.

5. The rechargeable battery of claim 4, wherein the electrode assembly comprises one electrode assembly or two electrode assemblies.

6. The rechargeable battery of claim 4, wherein the electrode assembly comprises two electrode assemblies, and the uncoated regions of the same polarity face each other to be coupled to a respective one of the internal plates.

7. The rechargeable battery of claim 1, wherein the insulating case is formed from one piece of material and is bent to accommodate the electrode assembly.

8. The rechargeable battery of claim 7, wherein the insulating case further comprises: second and third surface portions bent from the first surface portion to face each other at opposite surfaces of the electrode assembly; fourth and fifth surface portions that protrude at edges of the second and third surface portions to face lateral sides of the electrode assembly; and a sixth surface portion that protrudes at edges of the second and third surface portions and is opposite to the uncoated regions.

9. The rechargeable battery of claim 8, wherein the fourth, fifth, and sixth surface portions further comprise flanges that protrude in directions parallel to the second and third surface portions to be coupled to each other.

10. The rechargeable battery of claim 9, wherein the flanges form an interval between an inner surface of the case and an outer surface of the insulating case.

11. The rechargeable battery of claim 1, wherein the insulating case comprises an internal vent hole corresponding to a vent hole of the cap plate.

12. The rechargeable battery of claim 1, wherein the insulating case comprises an internal electrolyte injection opening corresponding to an electrolyte injection opening of the cap plate.

\* \* \* \* \*